United States Patent [19]
Kato et al.

[11] Patent Number: 5,809,447
[45] Date of Patent: Sep. 15, 1998

[54] VOICE NAVIGATION BY SEQUENTIAL PHRASE READOUT

[75] Inventors: Kiyohide Kato, Aichi; Koji Hashimoto, Kariya, both of Japan

[73] Assignee: Aisin AW Co., Ltd., Japan

[21] Appl. No.: 626,289

[22] Filed: Apr. 4, 1996

[30] Foreign Application Priority Data

Apr. 4, 1995 [JP] Japan .................................. 7-078592

[51] Int. Cl.⁶ .......................... G01C 21/00; G06F 165/00
[52] U.S. Cl. ........................................... 701/211; 340/996
[58] Field of Search ............................ 364/444.1, 444.2, 364/449.3, 449.4, 449.5; 340/996; 701/201, 202, 209, 210, 211

[56] References Cited

U.S. PATENT DOCUMENTS

| | | | |
|---|---|---|---|
| 4,882,696 | 11/1989 | Nimura et al. | 364/449 |
| 5,177,685 | 1/1993 | Davis et al. | 364/443 |
| 5,406,492 | 4/1995 | Suzuki | 364/449 |
| 5,410,486 | 4/1995 | Kishi et al. | 364/449 |
| 5,452,212 | 9/1995 | Yokoyama et al. | 465/449 |
| 5,452,217 | 9/1995 | Kishi et al. | 364/449 |
| 5,592,389 | 1/1997 | La Rue et al. | 364/449.5 |

Primary Examiner—Michael Zanelli
Attorney, Agent, or Firm—Lorusso & Loud

[57] ABSTRACT

A vehicle navigation device provides route guidance by voice or the like in accordance with a preset route. The system includes data storage for storing data such as data relating to a map and route guidance voice data. The system reads out the route voice guidance data from storage and outputs the route voice guidance data directly as voice guidance. An input device allows for inputting information for setting or instructing the route guidance. A current position detector detects current position of the vehicle and a controller sets a route from the current position to a destination, with temporary storage of that set route. A voice data editor edits the combination of phrases of the guidance message relating to an intersection, a diverging point, etc., on the set route in temporary storage. The controller controls the reading out of the voice data from storage in sequential fashion and outputs the read voice data at a predetermined distance before a guide point utilizing the edited combination of phrases.

11 Claims, 8 Drawing Sheets

FIG. 1

| VOICE DATA TYPE | VOICE DATA CONTENTS | PRIORITY |
|---|---|---|
| DISTANCE PHRASE A | 1  ABOUT 700m AHEAD<br>2  ABOUT 300m AHEAD<br>3  SOON<br>4  AHEAD<br>5  JUSTAHEAD<br>..... | 3<br>3<br>2<br>2<br>2<br>... |
| DIRECTION PHRASE B | 1  TURN TO THE RIGHT<br>2  TURN TO THE LEFT<br>3  GO STRAIGHT AHEAD<br>4  EXPRESS-HIGH-WAY<br>5  EXIT RIGHTWISE<br>..... | 1<br>1<br>1<br>2<br>2<br>... |
| CROSSING NAME PHRASE C | 1  FUJII-CHO<br>2  OGAWA-CHO<br>3  ISHII-CHO<br>4  TOYO-CHO<br>..... | 4<br>4<br>4<br>4<br>... |
| MARK NAME PHRASE D | 1  MUNICIPAL OFFICE<br>2  ART MUSEUM<br>3  BANK<br>..... | 4<br>4<br>4<br>... |
| ⋮ | ⋮ | ⋮ |

VOICE NAVIGATION BY SEQUENTIAL PHRASE READOUT

BACKGROUND OF THE INVENTION

1. Field of the Invention

The present invention relates to a vehicle navigation device which provides route guidance, e.g. voice guidance, in accordance with a preset route.

2. Description of the Related Art

A variety of vehicle navigation devices have been proposed. For example, one type of device notifies a driver of the direction to be taken at an intersection by voice or by a combination of voice and a display, responsive to detection that the vehicle has entered within a specified area including the intersection (for example, Published Unexamined Japanese Patent Application No. S60-202307). Another type notifies a driver of the direction of advance after having travelled at a predetermined distance past the intersection (for example, Published Unexamined Patent Application No. S63-211499). Yet another type generates a request signal for road guidance in response to a request from the driver and outputs road guidance voice information corresponding to the current position of the vehicle.

In general, vehicle navigation devices that output voice road guidance information in response to a request from the driver utilize voice data which is compressed and stored in a CD-ROM. A voice data RAM (voice buffer) and an ADPCM (adaptive differential pulse code modulation) decoder, that converts a digital signal into an analog signal, are provided between a CD-ROM driver and a voice output device. Also, the voice data relating to an intersection or a diverging point as stored is divided into phrases. Upon selecting phrases of the voice data relating to the intersection or diverging point, each selected phrase is read out from the CD-ROM and temporarily stored in the voice buffer and, when there is a request for voice output, the decoder converts the compressed data into a voice signal before outputting it. Such navigation devices may be designed so that the phrases most frequently used are always stored in the buffer, but the phrases little used are cleared from the buffer after being used. However, the above-mentioned vehicle navigation devices are expensive due to the costs of the voice data RAM (voice buffer) and the ADPCM decoder. There has also been proposed a system in which the voice buffer and the ADPCM decoder are omitted and, upon receiving a request for voice guidance, access is gained directly to a CD-ROM to read out a voice signal. However, because guidance information relating to the intersection and the diverging point, which is in the form of complete messages, is stored in the CD-ROM, a large storage capacity is required for the voice signals. Furthermore, even in the case where the voice data is compressed and stored in the CD-ROM, a large number of messages cannot be completely stored therein because of a limited capacity, which creates a problem in that appropriate voice guidance cannot be executed.

BRIEF SUMMARY OF THE INVENTION

The object of the present invention is to solve the above-mentioned problems. Toward this end the present invention provides a vehicle navigation device which reads a voice signal directly from a CD-ROM which stores, not only the voice signal, but also other data for outputting the read voice signal.

More specifically, the present invention provides a vehicle navigation device which gives guidance, e.g. by voice, in accordance with a preset route, and which includes: storage means for storing the data necessary for conducting navigation, such as data for display of a map and route guidance voice data; read means for reading out the route guidance voice data from the storage means; voice output means for outputting the route guidance voice data, read out by the read means, directly as voice guidance; input means for inputting information to set a position or to request route guidance; current-position detection means for detecting the current position of the vehicle; control means including route setting means for setting a route from the current position to a destination, route storage means for temporarily storing the route that has been set, and voice data edit means for editing the combination of phrases of the route guidance voice data relating to an intersection, a diverging point, etc., on the basis of the set route stored in the route storage means. The control means controls the read means so that the read means sequentially reads the voice data from the storage means and outputs the read voice data, at a predetermined distance before a guide point, as the edited combination of phrases. In accordance with the present invention, the voice signal can be directly read out and outputted from the CD-ROM that stores not only the voice signal but also other data therein.

The control means controls the read means so as to judge the completion of construction of each phrase to sequentially read out the voice data. The control means also inhibits the execution of other processing until the output of the voice data has been completed, when another processing execution instruction is given to the control means while the route guide voice data is being outputted, or inhibits the reading of the voice data when another processing is being executed, in a situation where the voice data should be read out and output at a predetermined distance before a guide point, and reads out and outputs the voice data after judging the completion of the other processing. As a result, voice guidance can be read out by the read means and output from the voice output means as is. Thus, the voice guidance is smoothly output without any interruption of guidance. Also, if the same recording medium is used, the quantity of the data stored can be less than what is stored in a composition unit, and the structure can be simplified with the omission of a voice data RAM (voice buffer) and an ADPCM decoder.

Furthermore, the above-mentioned voice data to be read out and output after the completion of the other processing may be the combination of phrases edited by the voice data edition means in advance, the voice data reedited by guide voice alteration means, or the voice data reedited on the basis of the current position of the vehicle at the time of completion of the other processing. The above-mentioned route guide voice data is ranked in accordance with a priority, and the guide voice alteration means alters the data to provide route guidance voice data consisting of the phrases highest in priority.

The above and other objects and features of the present invention will become more apparent from the following description taken in conjunction with the accompanying drawings.

DETAILED DESCRIPTION OF THE PREFERRED EMBODIMENTS

A description will be given in more detail of embodiments of the present invention with reference to the accompanying drawings.

Figure 1:
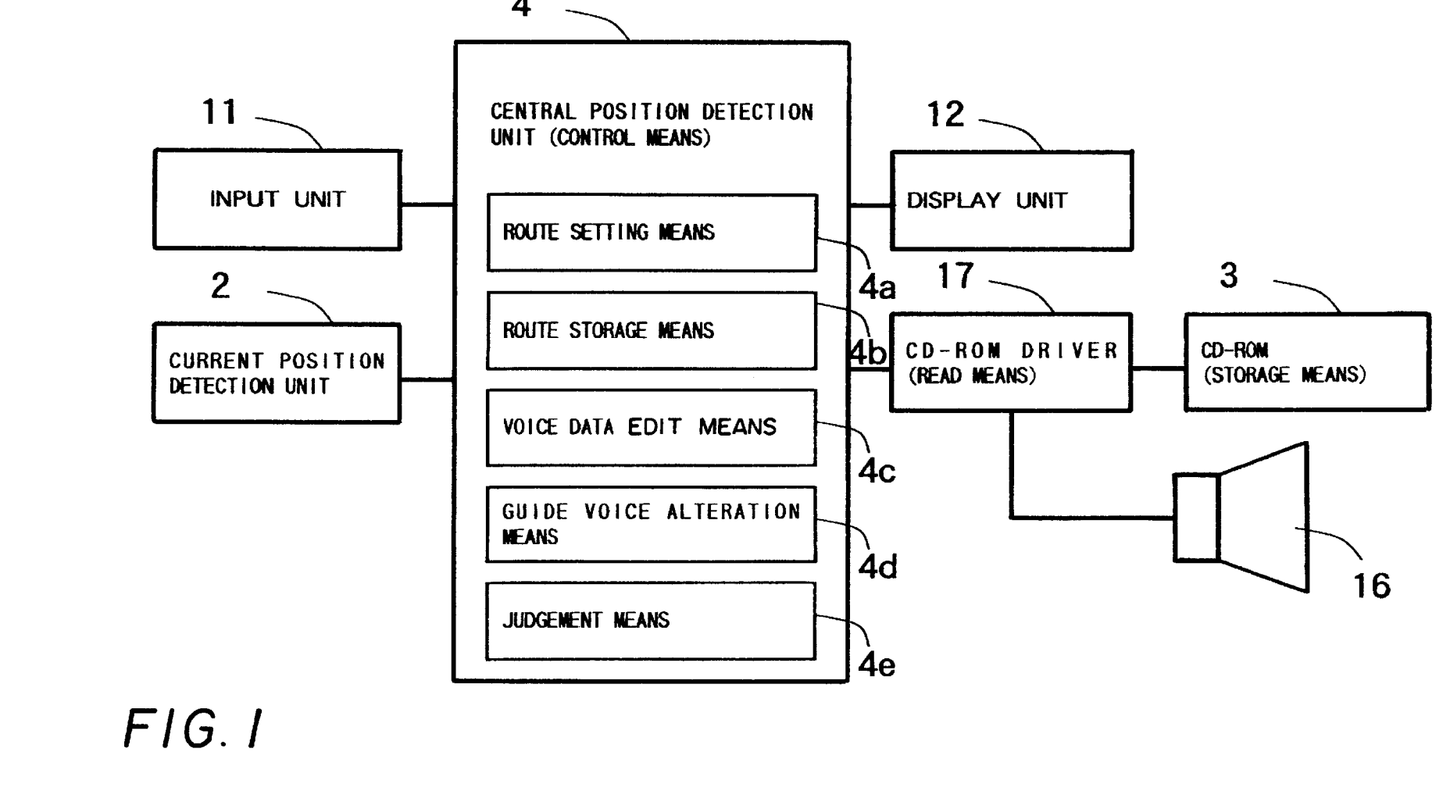
FIG. 1 is a block diagram showing a vehicle navigation device in accordance with one embodiment of the present invention.

FIG. 1 shows a vehicle navigation device in accordance with one embodiment of the present invention including a current-position detection unit 2, a CD-ROM 3, a central processing unit 4, a route setting means 4a, a route storage means 4b, a voice data edit means 4c, a guide voice alteration means 4d, a judgement means 4e; an input unit 11, a display unit 12, a speaker 16, and a CD-ROM driver 17.

The CD-ROM 3 is a memory means for storing the data necessary for conducting navigation, such as the data for setting a destination or a starting location, the data for retrieving a route, the data for display of a map, and the voice data for route guidance. The route guidance voice data is divided into individual phrases which can be randomly accessed as stored. The CD-ROM driver 17 is a read means for reading out the route guidance voice data from the CD-ROM 3. Speaker 16 is a voice output means for outputting the route guidance voice data read out by the CD-ROM driver 17 directly as voice guidance. The display unit 12 is designed to display a position setting screen for setting a position on a map such as a destination, a position registration screen and other route guide information. The input unit 11 is an input means for inputting information to instruct position setting or start of route guidance, and to instruct enlargement/reduction of a map displayed on the display unit 12, or the like. The current-position detection unit 2 is designed to detect the current position of the vehicle. The central processing unit 4 is a control means for controlling the entire system and includes: a route setting means 4a for setting a route from the current position to a destination by retrieving a route when the destination has been set; a route storage means 4b for temporarily storing a route which has been set by the route setting means; a voice data edit means 4c for editing the route guide voice data; a guide voice alteration means 4d for reediting the route guide voice data; and a judgement means 4e for judging the completion of another processing operation (routine) in the case where the reading of voice data is placed in a standby state because that other processing is being executed at the time a request for reading voice data is input. The control means controls the CD-ROM driver 17 so as to read out from the CD-ROM 3 the route guidance voice data edited by the voice data edit means 4c and to output it from the speaker 16 as the voice guidance. Hence, the phrases of route guidance voice data are edited at the first predetermined distance before a guide point, for example, an intersection or a diverging point, on the basis of the current position detected by the current position detection unit 2 and the route stored in the CD-ROM 3. Thereafter, the route guidance voice data is sequentially read out and output at the second predetermined distance before the guide point on the basis of the combination of the edited phrases of voice data.

Figure 2:
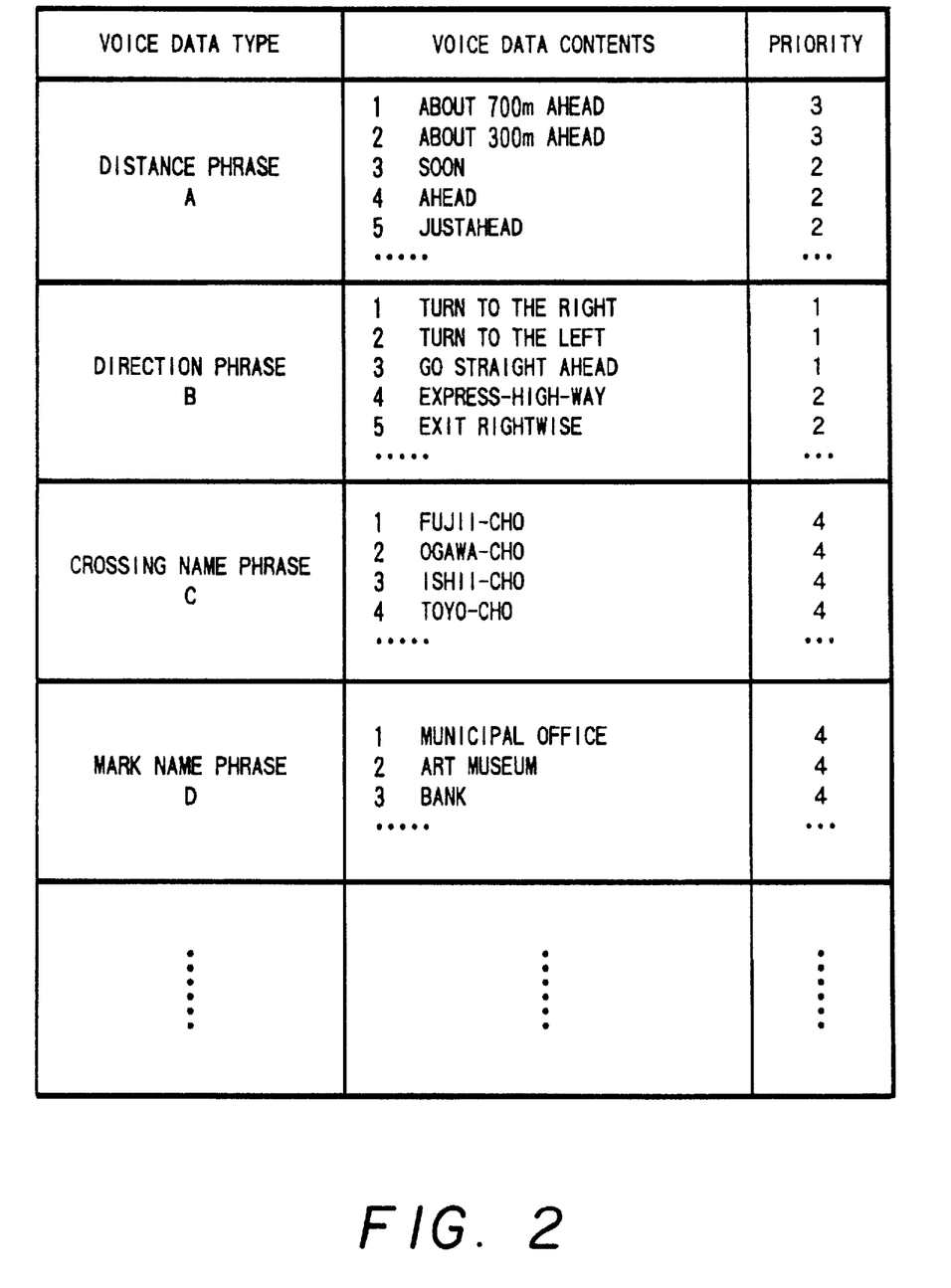
FIG. 2 is a table illustrating an example of the structure of stored voice data as phrases.
Figure 3:
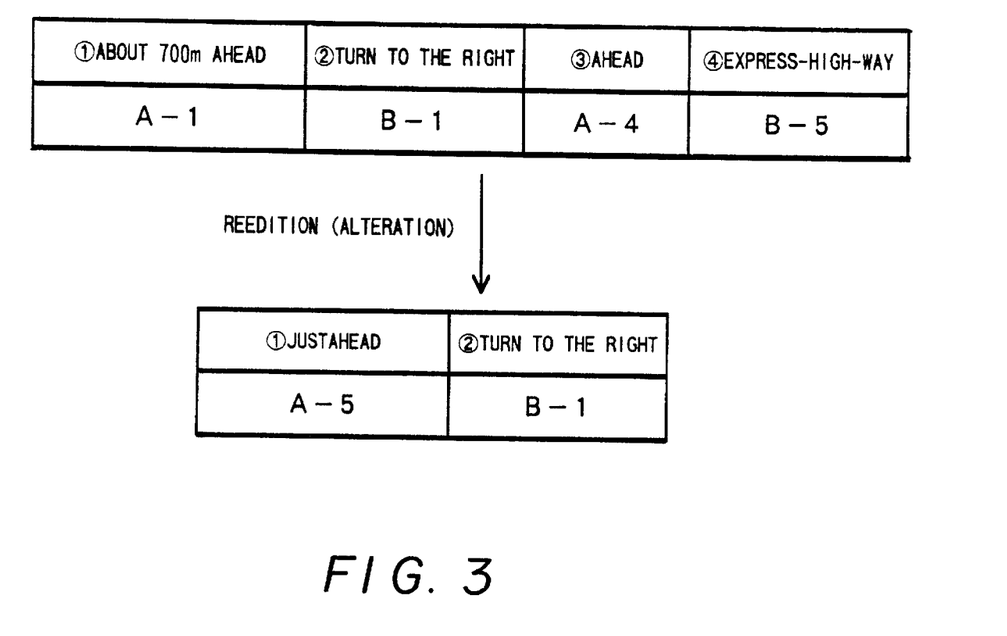
FIG. 3 is a table illustrating another example of structure of stored voice phase data.

The guide voice alteration means 4d is designed so that, in the case where the voice guidance cannot be output at a predetermined time because the CD-ROM driver 17 is reading a map or other route guidance data, with the result that the reading of the route guidance voice data edited by the voice data edit means 4c is delayed, the guidance voice alteration means 4d alters the route guide voice data which has already been edited to the condensed data representing the minimum necessary quantity of information, and reads it out from the CD-ROM 3 after the judgement means 4e judges that the other reading of other data has been completed. For this purpose, the route guidance voice data stored in the CD-ROM 3 and output as the voice guidance is divided into respective phrases, e.g. a distance phrase, a direction phrase, an intersection name phrase, a mark name phrase, etc., as shown in FIG. 2, and priority or weight is given to the respective voice data phrases. Then, in the case where the voice guidance alteration means 4d alters the route guidance voice data, it alters the voice data in such a manner that only the route guidance voice data for those phrases higher in priority is output. For example, it is assumed that the combination of phrases edited as shown in FIG. 3 is "about 700 m ahead, turn to the right, then, a speedway". Then, if reedition is conducted with "1", which is high in priority, the combination of those phrases becomes "ahead, turn to the right". In the case of such processing, the phrases of route guidance voice data are edited at the first predetermined distance (>700 m) preceding the guidance point such as an intersection or a diverging point, and thereafter the route guidance voice data is sequentially read out and output as a combination of the phrases edited at the second predetermined distance (=700 m) ahead of the guide point.

Then, when the vehicle reaches a third predetermined distance (for example, 100 m) ahead or in the vicinity of the guide point, because the combination of the phrases edited at the second predetermined distance (=700 m) before the guide point cannot be read, the combination is reedited. Needless to say, after a predicted time for when the vehicle will pass the guide point is calculated on the basis of vehicle speed and remaining distance, the timing of outputting the voice guidance may be set on the basis of the predicted time so that the appropriate time is not missed. Also, although the above-described embodiment is designed so that the phrases of route guidance voice data are edited at a predetermined distance ahead of the guide point, the phrases may be edited further in advance, after setting the route.

An example of a control routine for the above-described vehicle navigation device will now be described with reference to FIGS. 4 and 5.

Figure 4:
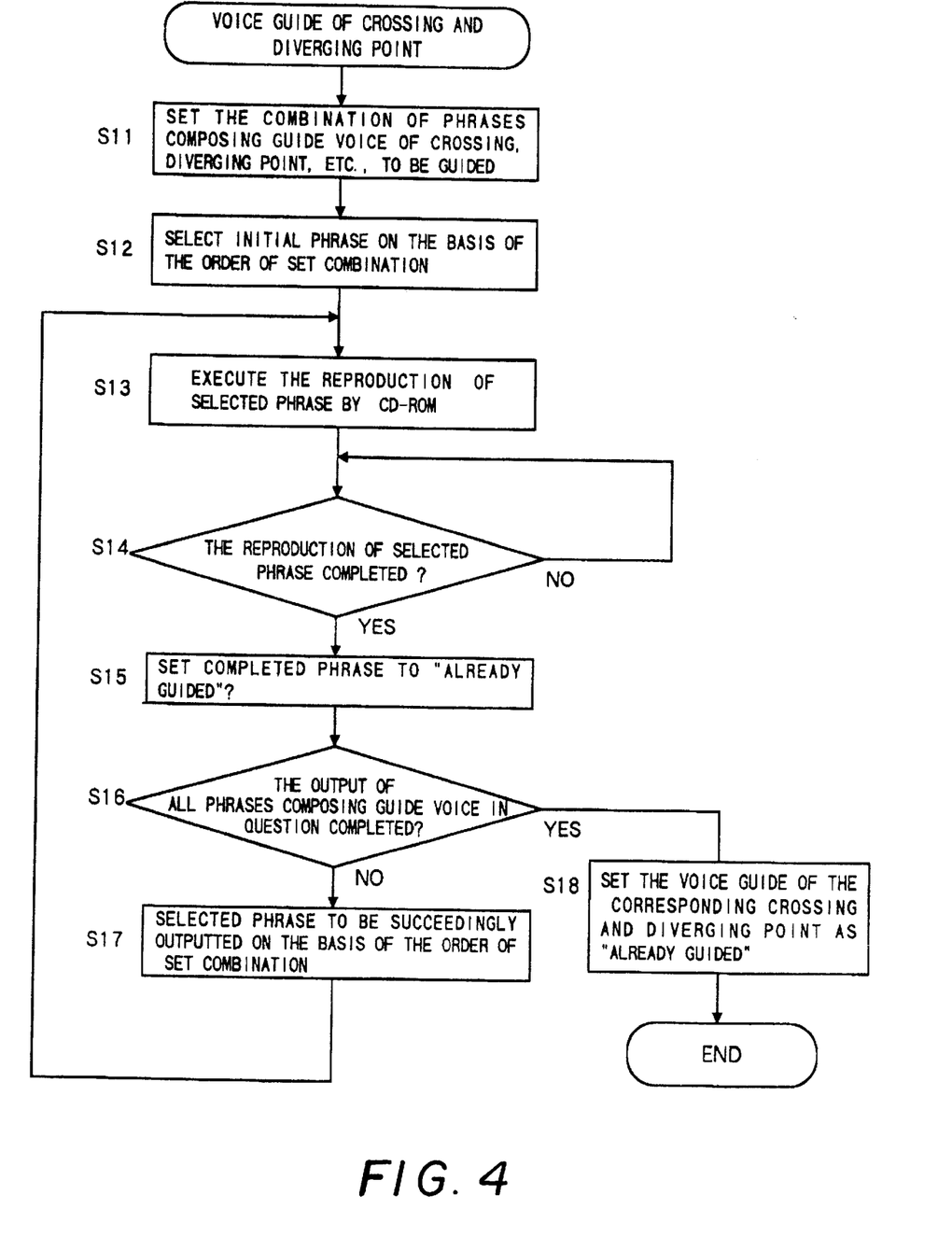
FIG. 4 is a flow chart of voice guidance routine for an intersection and a diverging point (fork in road)

As shown in FIG. 4, when the combination of the phrases for a guidance message for an intersection or a diverging point is set (Step S11), an initial phrase is selected on the basis of the order of the combination which has been set (Step S12), and a phrase selected by the CD-ROM driver 17 is read out from the CD-ROM 3 with reproduction through the speaker 8 (Step S13). After the reproduction of the selected phrase has been completed (Step S14), the reproduced phrase is flagged "already guided" (Step S15). Then, a determination is made as to whether or not output of all phrases of the voice guidance message in question has been completed (Step S16). If it is not completed, the phrase to be next output is selected on the basis of the order of the set combination (Step S17), and the control routine returns to Step S13. The same processing is repeatedly executed until outputting of all the phrases of the voice guidance message in question has been completed. When the output of all the phrases has been completed, the voice guidance for the corresponding intersection or diverging point is flagged to "already guided" (Step S18).

As described above, according to the present invention, access is gained directly to a CD-ROM 3 in the order of the combination of phrases composing the guidance message, so that the guidance message is read and output. Furthermore, when it is judged that the output of one phrase has been completed, the succeeding phrase is then output.

Similarly, when it is judged that the output of phrases for one guidance message has been completed, a succeeding routine, that is, a routine for accessing the CD-ROM 3 is executed. In the system in which access is gained directly to the CD-ROM to read out a voice guidance message, the voice guidance message can be smoothly output. Also, because the routine advances in such a manner that access is gained to a succeeding CD-ROM after it is judged that the voice guidance has already been output, the interruption of the guidance is eliminated.

Figure 5:
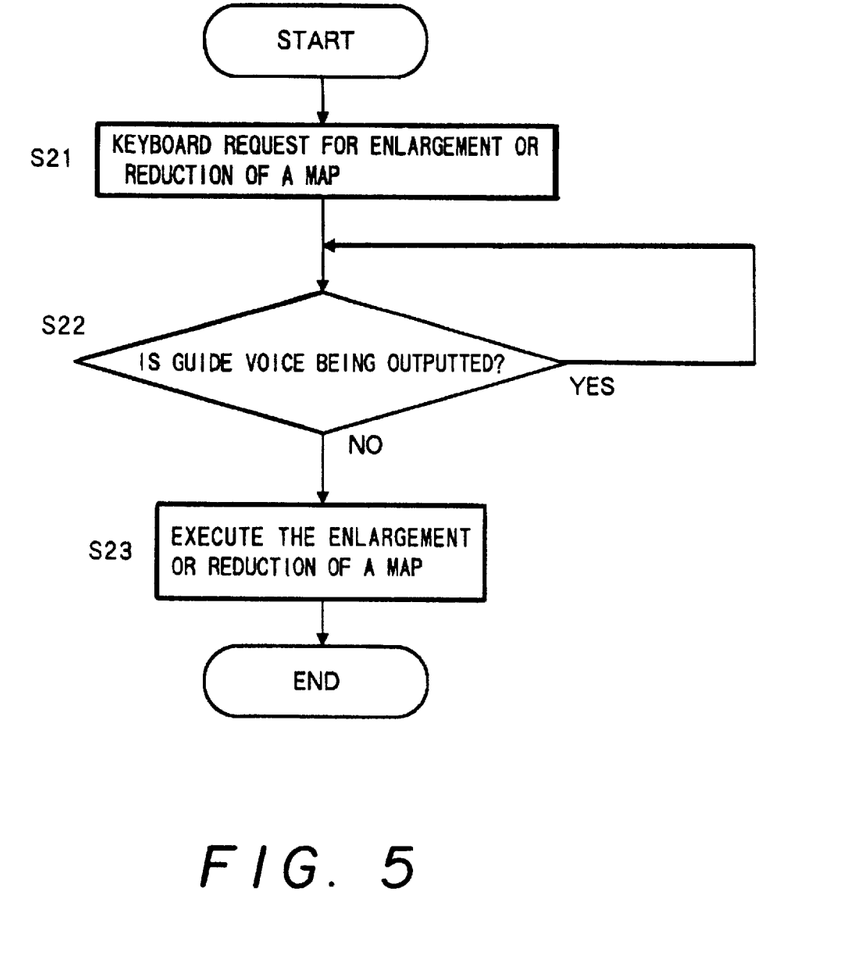
FIG. 5 is a flow chart for enlarging/reducing a map by keyboarding.

A routine for processing a request for the enlargement/reduction of a map while a voice guidance message is being output is shown in FIG. 5. When a driver has input, through a keyboard, a request for the enlargement/reduction of a map displayed on a screen of the display unit (Step S21), it is judged whether or not a voice guidance message is being output (Step S22). If a voice guidance message is being output, the request is held in a standby state. If it is judged that the voice guidance has been completed, that is, if it is judged that the entire combination of phrases has been completely flagged as "already guided", the "enlargement" or "reduction" of the map is executed on the basis of the request through the keyboard (Step S23). In this way, when a request is input through a keyboard while a voice guidance message is being output, the request is placed in standby, and after the output of the voice guidance has been completed, processing is executed in accordance with the keyboard request. In other words, the execution of the routine requested through the keyboard is inhibited. Processing of a request for executing another routine while a voice guidance message is being output is illustrated above for the case in which a request for "enlargement" or "reduction" of a map is keyboarded. However, such processing is also applicable to, for example, the case in which scrolling of a map screen is requested, the case in which a change-over from a map screen to another information screen is requested, and the like. Also, in the above-described embodiment, when the execution of another routine is requested while voice guidance is being output, the request is held on standby, and after it is judged that the voice guidance message has been completed, the processing as requested is executed. Alternatively, the input device, e.g. keyboard, may be rendered inoperative while the voice guidance message is being output. For example, in case of a display unit having a touch panel in which a key display section on the touch panel is depressed for keyboarding, the color of the key display section in the input inoperative state may be changed from that of the input enabled state or darkened, or the lighting of the key display section may be switched off.

In the system in which a voice signal is directly read and output as in the present invention, the voice data cannot be read while other data is being read by accessing the CD-ROM. Thus, the system becomes inconvenient to use when the timing of reading the voice data is shifted, causing the voice guidance message to be output at an inappropriate time. Therefore, in the case where the timing of the voice data reading is shifted, if the voice data is stored as phrases, flexibility is provided in alteration of the combination of phrases constituting the voice guidance message.

Figure 6:
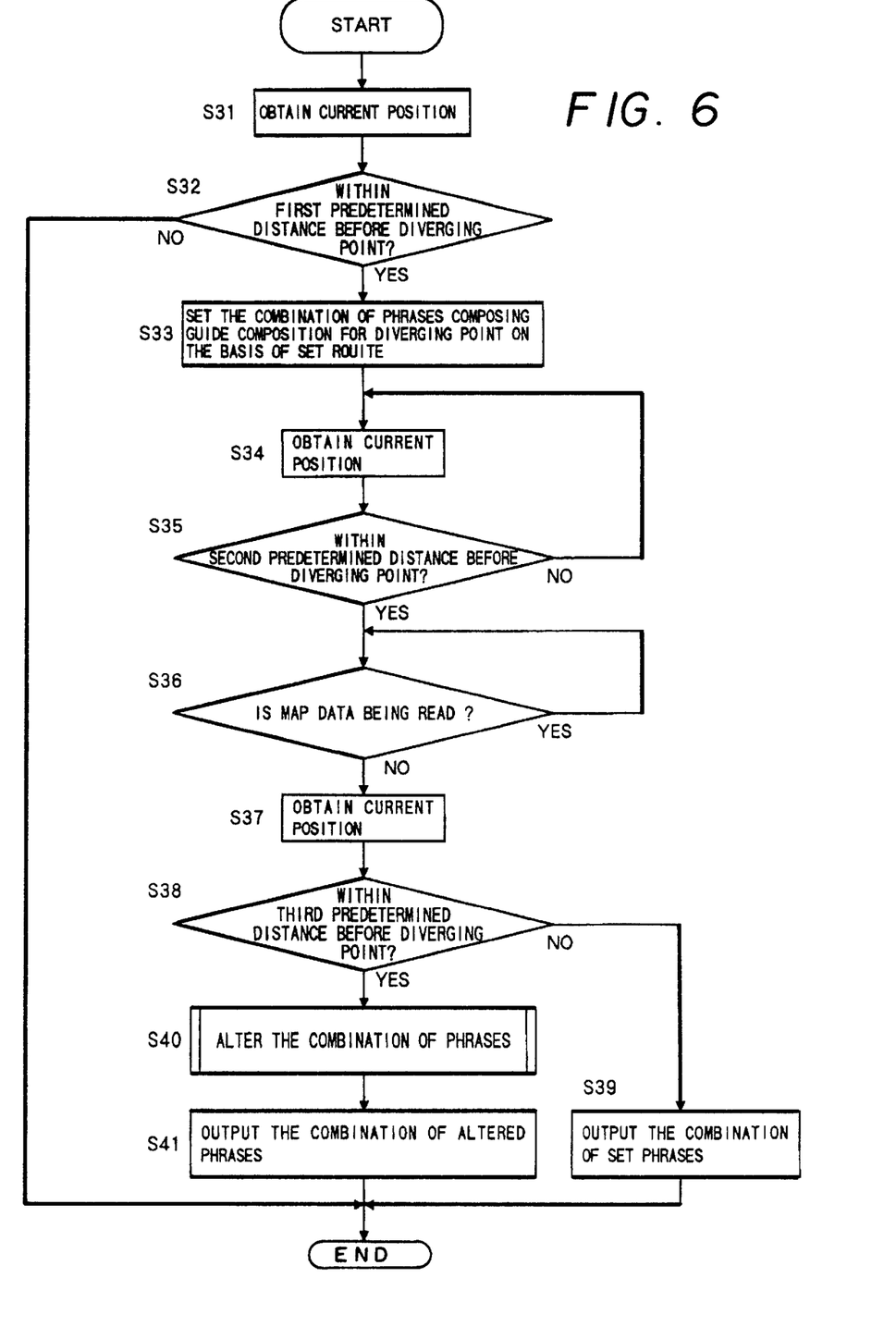
FIG. 6 is a flow chart for operation of a vehicle navigation device in accordance with another embodiment of the present invention.

In the case where the voice guidance cannot be output because map data is being read, a routine for controlling operation so that output of the voice guidance starts after completion of the reading of map data is executed as described below. As shown in FIG. 6 a current position is first obtained (Step S31), then a determination is made as to whether or not the vehicle is within a first predetermined distance before a diverging point (road branching point or intersection) (Step S32). If it is not within the first predetermined distance, the control operation is ended. If it is within the first predetermined distance, the combination of phrases composing a guidance message for the diverging point is set on the basis of the set route (Step S33). The first predetermined distance determines the time at which the combination of phrases is edited, which comes before the time (determined by the second predetermined distance) at which the voice guidance message is output. Subsequently, a current position is obtained (Step S34), and a determination is made as to whether or not the vehicle is within the second predetermined distance preceding the diverging point (Step S35). If within the second predetermined distance, it is next determined whether or not another routine, for example, the reading of map data is being executed (Step S36). If the map data is being read (if another routine is being executed), the control routine for voice guidance is placed on standby until the reading of the map data is completed, and after that reading of data has been completed, the current vehicle position at that time is obtained (Step S37), and a determination is made as to whether or not the vehicle is within a third predetermined distance before the diverging point (Step S38). The third predetermined distance is a distance predetermined to be inappropriate for output of the combination of phrases, edited at the time of the first predetermined distance, as voice guidance. In other words, it is a distance judged to be too close to the guide point for effective use of the voice guidance message as first edited. The relationship is (first predetermined distance) >(second predetermined distance) >(third predetermined distance). If the vehicle is not within the third predetermined distance, the combination of phrases set in Step S33 is output as a voice guidance message (Step S33). In the case where the vehicle has come within the third predetermined distance, the combination of phrases is altered (Step S40), and the combination of phrases thus altered is output as the voice guidance message (Step S41).

As described above, where the output of voice guidance is delayed until after map data has been read, the preset combination of phrases may become inappropriate. Therefore, in the case where the current vehicle position at the time when the reading of map data has been completed is close to the diverging point which is the subject of the guidance to be output, a routine is executed to alter the combination of phrases composing the voice guidance message. Possible alterations include omission of a phrase relating to distance, changing a distance phrase in accordance with the remaining distance and cancellation of the guidance message entirely. For example, the combination of phrases composing the guidance message may be simplified as shown in FIG. 3 which illustrates a case where distance of the vehicle from the diverging point is very short. With the alteration of the combination of phrases composing the guidance message, an inappropriate message can be prevented from being output and, even if the vehicle has closely approached the guide point, a combination of phrases providing a short voice guidance message enables accurate guidance to be executed. Also, with the cancellation of the voice guidance message the problem created where the driver could not comply or would be bewildered by the guidance message output immediately before the diverging point, is eliminated.

Furthermore, in the case where the combination of phrases is altered at the third predetermined distance before the guide point, due to a delay in the reading of the voice guidance data, if the vehicle enters within a fourth predetermined distance without the alteration of the combination of phrases having been finished prior to entry into that fourth predetermined distance, the guidance message may be cancelled. Also, the above-mentioned embodiment is so designed that the output of the voice guidance message starts after the reading of map data has been completed. For example, in the case where map data is divided into a plurality of areas in advance and stored in the storage means as separate blocks, when the output of the guidance message is requested while the map data is being read, even though all the map data has not been read, the reading of map data may be suspended upon completion of a block unit so that the output of the guidance message may be executed.

Figure 7:
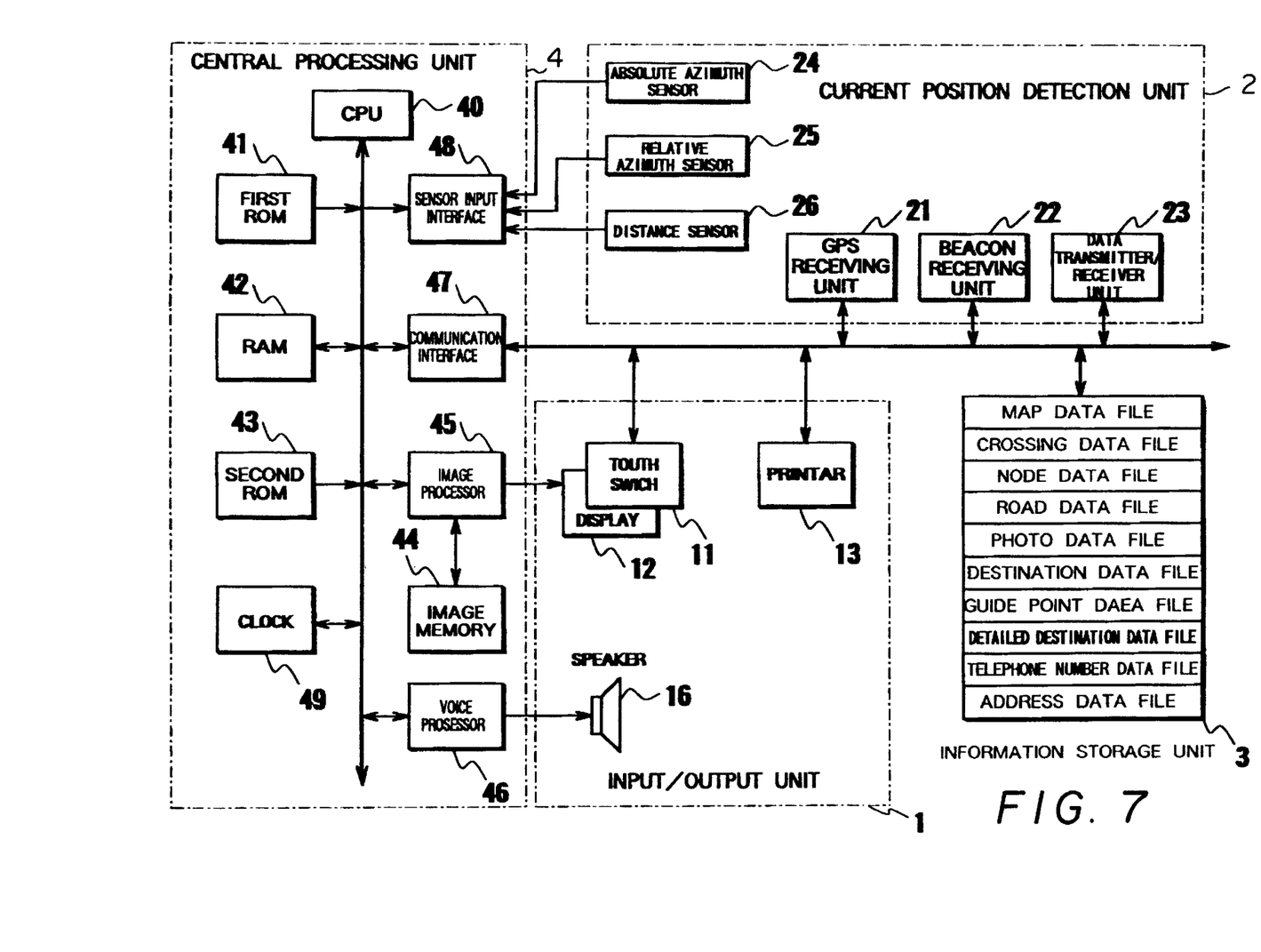
FIG. 7 is a block diagram of the entire system of the vehicle navigation device to which the present invention is applied.

As shown in FIG. 7 the vehicle navigation system to which the present invention is applied includes an input/output unit 1 for inputting/outputting information relating to route guidance, a current position detection unit 2 for detecting information relating to the current position of the vehicle, an information storage unit 3 which stores the navigation data necessary for determining an optimum route and the display guidance data necessary for providing a leading guide, and a central processing unit 4 for executing a route retrieval routine, including determination of the optimum route, for providing the route guidance and for controlling the entire system.

The input/output unit 1 functions to input a destination, to instruct the central processing unit 4 to execute a navigation routine in accordance with an intention of the driver so that guidance information is output through voice and/or a display screen as required by the driver, and to print data as processed. As means for realizing those functions, the input section has a touch switch 11 or an operating switch used for inputting a destination as a telephone number or coordinates on a map and for requesting route guidance. The output section has a display screen 12 for displaying input data or for automatically displaying the route guidance in accordance with the driver's request, and a printer 13 for printing data processed through the central processing unit 4 and data stored in the information storage unit 3, a speaker 16 for outputting the route guidance by voice, and so on.

The display 12 may be a color CRT or a color liquid-crystal display. The display 12 displays, with colors, all the screens necessary for navigation, such as a route setting screen, a section picture screen or an intersection picture screen, based on map data and guide data processed by the central processing unit 4, and also displays buttons used for setting the route guidance on a main screen, for leading guidance along the route, and for changing over the screen. In particular, information pertaining to a passed intersection, such as its name, is color-displayed on a section picture screen in a pop-up fashion.

The display unit 12 is installed within an instrument panel in the vicinity of the driver's seat, and the driver may determine the current location of his vehicle by viewing a section picture, and may also obtain information relating to the route ahead. The display 12 is provided with a touch panel 11 corresponding to the display of function buttons, and so designed that the above-mentioned operations may be executed on the basis of signals input by touching the buttons. An input signal generation means made up of that button, the touch switch and so on, would constitute the input section.

The current position detection unit 2 may be a GPS receiving unit 21 which utilizes a satellite navigation system (GPS=global positioning system), a beacon receiving unit 22, a data transmitter/receiver unit 23 that receives a correction signal for the GPS, for example, using a cellular phone or an FM multiple signal, an absolute azimuth sensor 24 consisting of a geomagnetic sensor and so on, a relative azimuth sensor 25 consisting of a vehicle wheel sensor, a steering sensor, a gyro and so on, a distance sensor 26 for detecting a running distance travelled from the rotational speed of a wheel, and so on.

The information storage unit 3 provides a data base that includes all the data necessary for the navigation device, consisting of files of map data, intersection data, node data, road data, photo data, destination point data, guide point data, detailed destination data, telephone number data, address data, etc., necessary for route guidance. In this example, the voice data for route guidance is included, for example, in the guide point data.

The central processing unit 4 includes: a CPU 40 for executing arithmetic operational processing; a first ROM 41 containing stored therein a program used for executing operations such as route retrieval, a program used for display output control in providing the route guidance and a voice output control used in providing voice guidance, and the data necessary for operating those programs; a RAM 42 that temporarily stores therein retrieved route guide information, such as the point coordinates of a destination, that has been set or a road surface code No., and the data which is being arithmetically processed; a second ROM 43 that stores therein display information data necessary for the route guidance and the map display; an image memory 44 that stores therein image data which is displayed on the display screen; an image processor 45 that retrieves the image data from the image memory 44 responsive to a display output control signal from the CPU 40, processes the image data and outputs it to the display screen; a voice processor 46 for outputting to the speaker 16 the route voice guidance data read out from the information storage unit 3 as is, responsive to a voice output control signal from the CPU; a communication interface 47 that conducts the delivery of input/output data in communication; a sensor input interface 48 for receiving the sensor signal of the current position detection unit 2; a clock 49 for writing date and time as internal diagram information; and so on. In this example, the driver can select either a screen display or a voice output.

Figure 8:
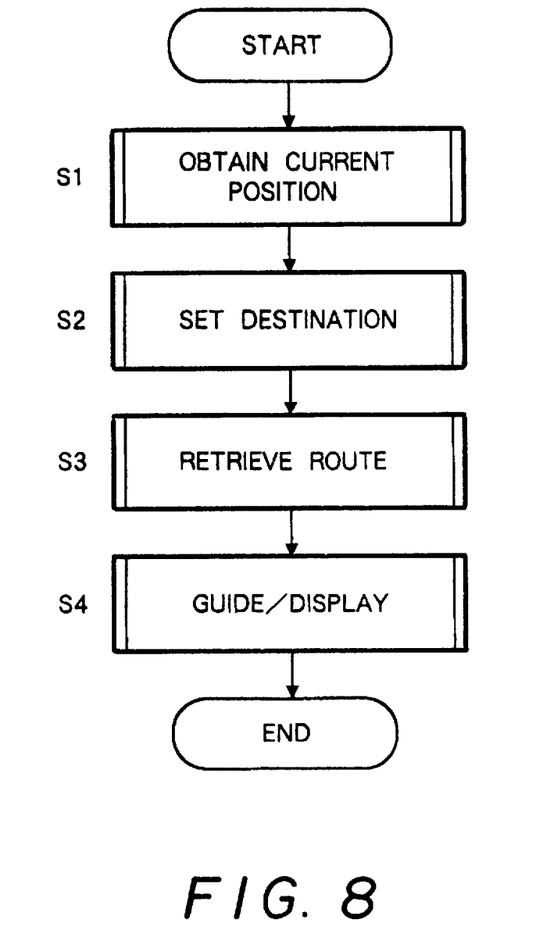
FIG. 8 is a flow chart for operation of the entire system of FIG. 7.

The operation of the above-described navigation system will now be described with reference to FIG. 8. The CPU 51 of the central processing unit 4 permits the program for route guidance to be started. Then, as shown in FIG. 8, the current position of the vehicle is detected by the current position detection unit 2, and a peripheral map centered on the current position, as well as the name of the current position, etc., are displayed (Step S1). Then, a destination and a point to be travelled through are set using a telephone number, an address, a facilities name, a registered point or other input (Step S2), and a route from the current position to the destination or a route passing through a designated point is determined and retrieved (Step S3). Upon determination of the route, route guidance using a voice output and the route display is repeatedly executed until the vehicle reaches the destination while the current position is tracked by the current position detection unit 2 (Step S4). In the case where the setting of a side trip is input before the vehicle reaches the destination, a retrieval area is set, and a side trip route is determined for the retrieval area.

It should be noted that the present invention is not limited by or to the above-described embodiments and can be variously modified. For example, while in the above-described embodiments the information storage unit 3 is a CD-ROM, other storage means may be used such as a floppy disc, an IC card or the like. Also, in the processing of Step S40 shown in FIG. 6, in order to alter the combination of phrases, priority or weight may be given to the different phrases of the guidance message. For example, the highest priority may be given to a turn to be made (or not made) such as "turn to the right" or "turn to the left", and a remaining distance phrase is changed until a predetermined point or distance is reached. Other phrases may be sequentially deleted in accordance with their priority as the remaining distance becomes shorter.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various other embodiments and with various modifications as are suited to the particular use contemplated. It is intended that the scope of the invention be defined by the claims appended hereto, and their equivalents.

What is claimed is:

1. A vehicle navigation device for providing voice guidance for guiding a vehicle along a set route, which comprises:

main storage means for storing map data and route guidance voice data of individual phrases;

read means for reading out the route guidance voice data from said main storage means in the form of guidance instructions relating to intersections or road junctions on the set route, said guidance instructions including instructions each formed by a series of selected phrases from the stored individual phrases;

voice output means for outputting the route guidance voice data, read by said read means, directly as a voice message;

input means for inputting information for setting the route, said information including a destination;

current-position detection means for detecting a current position of the vehicle; and control means for controlling execution of a routine providing guidance including voice guidance during travel along the set route, said control means including route setting means for setting a route from the current position to the destination as the set route, route storage means for temporarily storing the set route, and voice data edit means for selecting phrases including combinations of phrases forming instructions from the stored individual phrases relating to corresponding intersections or road junctions on the set route prior to output by said voice output means as the voice message, said control means controlling said read means so that said read means reads voice data out for each combination of phrases forming an instruction in a sequence of phrases from said storage means and controlling said voice output means to output the sequence of phrases concurrently with the reading of the sequence of phrases so that the voice message is output a predetermined distance before a guide point on the set route.

2. A vehicle navigation device as claimed in claim 1, wherein said control means judges completion of a reading of said voice data for reproduction of a phrase by said read means and, upon judging completion, instructs the read means to read out the voice data for the next phrase in the sequence.

3. A vehicle navigation device as claimed in claim 1, wherein said control means inhibits execution of a different routine until completion of output of the voice message when a command for execution of said different routine is received by said control means while the routine for the voice guidance is being executed.

4. A vehicle navigation device for providing voice guidance for guiding a vehicle along a set route, which comprises:

main storage means for storing data relating to a map and route guidance voice data for forming phrases;

read means for reading out the route guidance voice data from said main storage means in the form of a combination of phrases;

voice output means for outputting the route guidance voice data, read by said read means, directly as a voice message;

input means for inputting information for setting a route, said information including a destination;

current-position detection means for detecting a current position of the vehicle; and control means for controlling execution of a routine for the voice guidance and including route setting means for setting a route from the current position to the destination as the set route, route storage means for temporarily storing the set route, and voice data edit means for editing the combination of phrases to relate to an intersection or a road junction on the set route temporarily stored in said route storage means prior to output by said voice output means as the voice message, said control means controlling said read means so that said read means reads voice data out for said combination of phrases in a sequence from said storage means and controlling said voice output means to output the voice message a predetermined distance before a guide point on the set route;

said control means inhibiting the voice data from being read out at said predetermined distance when a routine, different from said routine for the voice guidance, is being executed and instructs said read means to read out the voice data after judging completion of execution of the different routine.

5. A vehicle navigation device as claimed in claim 4, wherein the voice data read out after the completion of said different routine is for a combination of phrases as edited by the voice data edit means.

6. A vehicle navigation device as claimed in claim 4, further comprising phrase alteration means for reediting the combination of phrases as edited by said voice data editing means and wherein said voice data read out after the completion of said different routine is the voice data for the reedited combination of phrases.

7. A vehicle navigation device as claimed in claim 6, wherein said phrase alteration means reedits the combination of phrases on the basis of the current position of the vehicle at the time of the completion of said different routine.

8. A vehicle navigation device as claimed in claim 6, wherein said route voice guide data is organized with priority ranking of phrases and said phrase alteration means deletes the lower ranked phrases from the combination of phrases and retains phrases of higher ranking to form the voice message.

9. A vehicle navigation device as claimed in claim 7, wherein said route voice guide data is organized with priority ranking of phrases and said phrase alteration means deletes the lower ranked phrases from the combination of phrases and retains phrases of higher ranking to form the voice message.

10. A vehicle navigation device for providing voice guidance for guiding a vehicle along a set route, which comprises:

a data storage unit containing map data along with route voice guidance data in the form of phrases which can be randomly accessed;

a data read unit for reading out each phrase in the data storage unit as the individual phrase is accessed;

voice output means connected to the data read unit for outputting the route voice guidance data, read by said data read unit, directly as a voice message;

input means for inputting information for setting a route, said information including a destination;

current-position detection means for detecting a current position of the vehicle; and control means including route setting means for setting a route from the current position to the destination as the set route, route storage means for temporarily storing the set route, and voice data edit means for setting a sequence of phrases forming a voice message as a guidance instruction relating to an intersection or a road junction on the set route;

said control means controlling said data read unit to randomly access each phrase in the sequence of phrases set by the edit means in their order of sequence to read the sequence of phrases from the data storage unit, to operate said voice output means to output by voice each phrase in the sequence of phrases concurrent with the reading of each phrase from the data storage unit, to judge completion of the voice output of each phrase of the sequence to start the reading of the next phrase in the sequence of phrases upon completion of voice output of the previous phrase, and to output the voice message a predetermined distance before a guide point on the set route.

11. A vehicle navigation device as claimed in claim 10 wherein said data storage unit is a CD-ROM, and said data read unit is a CD-ROM driver.

* * * * *